United States Patent [19]
Ivkovich et al.

[11] 3,820,819
[45] June 28, 1974

[54] BICYCLE ACCESSORY

[76] Inventors: John C. Ivkovich, 12406 S. Emerald Ave., Chicago, Ill. 60628; Philip Billiteri, 7829 Central Ave., Morton Grove, Ill. 60053

[22] Filed: Oct. 10, 1972

[21] Appl. No.: 296,299

[52] U.S. Cl. ............................................. 280/231
[51] Int. Cl. ............................................. B62m 1/00
[58] Field of Search ........................... 280/231, 253

[56] References Cited
UNITED STATES PATENTS
364,782   6/1887   Thiessen ........................... 280/231
2,723,132  11/1955  Oberwegner ...................... 280/231

FOREIGN PATENTS OR APPLICATIONS
415,506   7/1925   Germany ........................... 280/231
461,815  12/1945   Canada ............................. 280/253
103,111   7/1898   Germany ........................... 280/253
24,085    9/1899   Great Britain ..................... 280/256

Primary Examiner—David Schonberg
Assistant Examiner—Jack D. Rubenstein
Attorney, Agent, or Firm—W. A. Snow; C. W. Rummler

[57] ABSTRACT

An accessory for a bicycle for allowing a second person rider to assist the first person in propelling the rear or driving wheel of a bicycle by employing a rearward extension of the foot pedals supported by a roller, and a framework secured to the rear axle of the bicycle.

2 Claims, 6 Drawing Figures

PATENTED JUN 28 1974　　　　　　　　　　　3,820,819
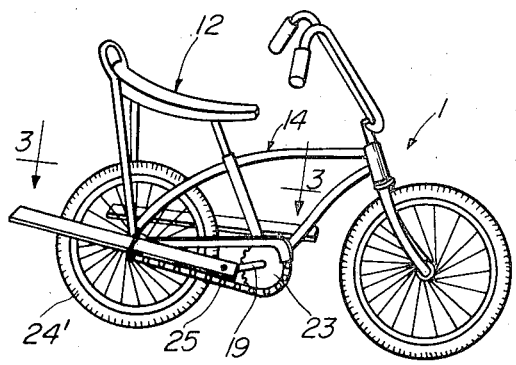
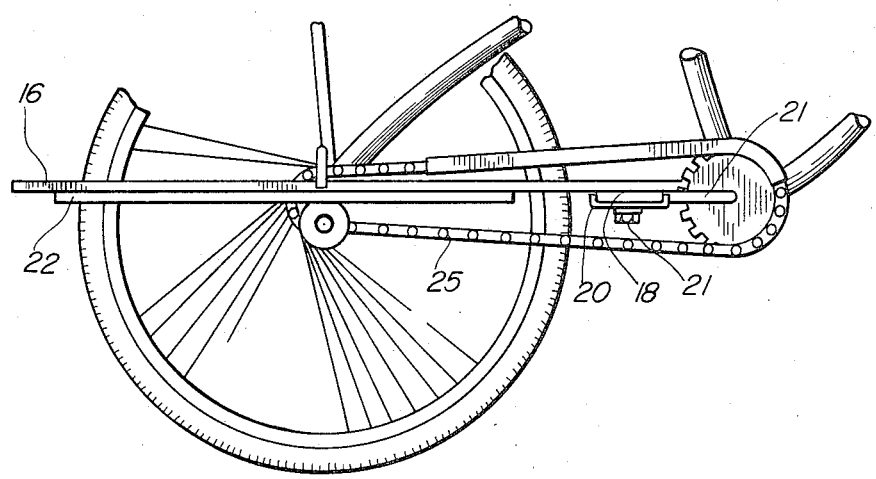
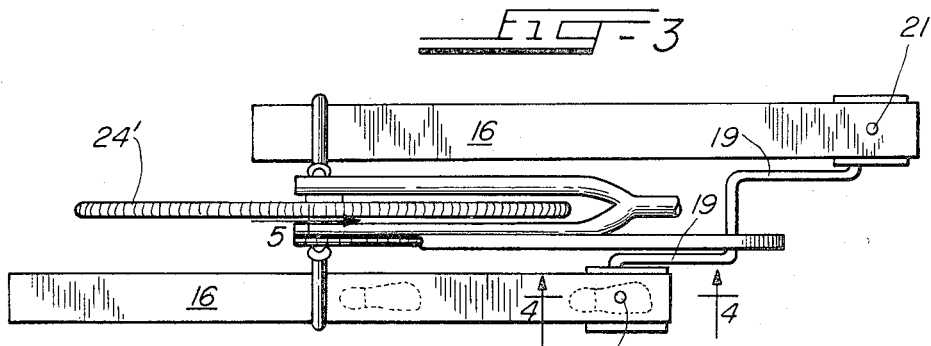
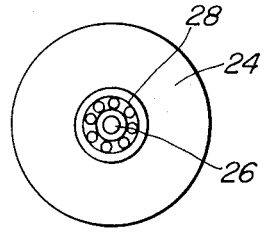
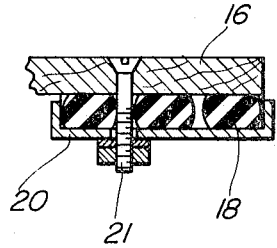
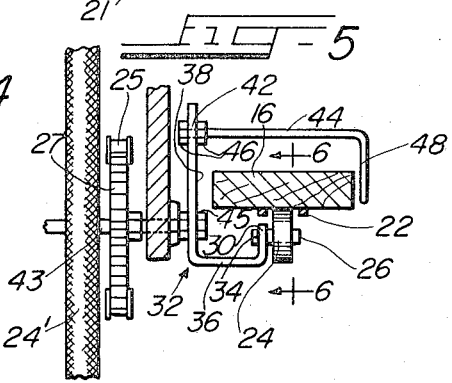

BICYCLE ACCESSORY

BACKGROUND OF THE INVENTION

Normal seats on the modern-day bicycles are usually provided with long narrow saddles of a length to allow two youngsters to seat thereon comfortably. Also, bicycles may be provided with a "luggage" carrier suspended over the rear wheel and tied to the seat and supported by an upright frame which is secured to the rear axle. These carriers are oftentimes used to carry a second person, who has a free ride without assisting in the propulsion of the bicycle. It was to overcome this "free ride" situation that the present invention was conceived. Also, this pedal extension makes a two-seater bicycle out of the usual one-seater type. The usual two-seater bicycle is quite costly as compared to a one-seater type. Thus this invention greatly cuts the cost.

The only prior art known is U.S. Pat. No. 2,723,132 issued Nov. 8, 1955. This art employs two seats, and a series of compound cranks on each side of a bicycle, one extending downwardly, with one end pivotally secured to a journal which is substituted for the usual spindle nut. The other end of this crank is pivotally secured to a second longer crank arm whose opposite end is journalled in the pedal, with a special stud having a groove and a ball bearing race.

SUMMARY OF THE INVENTION

An accessory for a bicycle comprising a pair of foot boards or the like each having one end anchored to a bicycle foot pedal to form a rearwardly extending pedal extension, while the other end is slidably supported on a roller such as a wheel, a U-shaped bracket having a short inner leg mounting an outwardly extending shaft on which the roller or wheel is supported, the longer leg of the U-shaped bracket being provided with an aperture for mounting on the rear axle of the bicycle, and an L-shaped stabilizer rod having one end anchored adjacent the free end of the leg of the U-shaped bracket and the other end bent downwardly whereby to assist in stabilizing the foot board while the extender is in use.

BRIEF DESCRIPTION OF THE DRAWINGS

FIG. 1 is a perspective view of a bicycle showing my invention secured thereto;

FIG. 2 is a side elevational view of one side of the bicycle but with parts broken away;

FIG. 3 is a top view taken substantially along the lines 3—3 of FIG. 1 with parts in section;

FIG. 4 is a cross-sectional view taken on the lines 4—4 of FIG. 3;

FIG. 5 is a cross-sectional view taken along the lines 5—5 of FIG. 3; and

FIG. 6 is an end elevational view taken on the lines 6—6 of FIG. 5.

DETAILED DESCRIPTION OF THE DRAWINGS

As illustrated in the embodiment shown in FIG. 1, the bicycle 10 is provided with an elongated saddle seat 12 suspended on and anchored to the frame 14 in the usual manner.

Although a pair of foot boards and framing are required, one for each bicycle foot pedal, the following is a description of one of the foot boards since both are constructed identically except one is for the left side and one for the right side of the bicycle.

The invention of the embodiment shown in the drawings comprises an elongated nonresilient foot board 16 secured at one end to the pedal 18 of the bicycle by a U-shaped clamp 20 straddling the lower end of the pedal 18 and bolted (as at 21) to the pedal 18 and the foot board 16, as shown in FIGS. 2 and 4. The foot board 16 extends rearwardly therefrom and is provided with a pair of spaced guide rails 22 on the lower surface thereof to form a guideway for the wheel or roller 24.

For better identification, the pedal 18 is rotatively secured to a crank arm 19 and extends at right angles thereto. The opposite end of the crank arm is integrally formed on a sprocket 23 which drives an endless chain 25. The opposite end of the chain is placed around a second sprocket 27 associated with the rear wheel 24' of a bicycle 10. The crank arm on the opposite side of the sprocket is directly opposite to said first crank arm and has a second pedal on its distal end, extending at right angles thereto.

The wheel or roller 24 is mounted for rotation on shaft 26 and positioned thereon and supported by a ball bearing race 28 with the inner race being press fitted on the shaft 26 (FIG. 6). The shaft extends outwardly and is secured to the vertically extending short leg 30 of the U-shaped framework 32 by insertion therethrough and bolted thereto by a nut and washer assembly 34.

The frame 32 is fabricated out of rod steel and has a short horizontally extending leg 36 to space the leg 30 away from the vertically extending long leg 38. The leg 38 is provided with an aperture for securing the same to the rear axle of the bicycle by the usual rear axle nut 45. The free end of the leg 38 is provided with an aperture 42 for the reception of one end of a horizontally extending rod 44 which is threaded and inserted through the aperture 42 and positioned on the leg 38 by a pair of nuts 46. The distal end of rod 44 is bent downwardly at right angles to form a short leg 48. Thus, as shown in FIG. 5, the upper end of rod 38 and the leg 48 form a stabilizer for the foot board 16.

The foot boards 16 on both sides of the bicycle are now an integral part of the foot pedals and as the pedals are rotated, the foot boards similarly rotate with the free end of the foot boards moving on the wheel or roller 24.

For a better appreciation of the size of the parts of this embodiment, the foot board is preferably constructed of a piece of wood approximately 36 inches by 3½ inches by three-eighths inches. The leg 38 has a height of approximately 4 inches while the leg 44 is about 4¼ inches. The wheel has a diameter of about 2 inches and is about one-half inch wide. Thus it is seen that this accessory is relatively small and adds very little weight to the bicycle and is not a clumsy accessory.

Now, when a second person accompanies the normal user of the bicycle, whether seated on the saddle or the luggage rack, such person may assist in pedaling the bicycle by pressuring the foot board in the same manner as the user does to drive the bicycle forwardly.

It now should be obvious that the original parts are not destroyed or substitution of other special parts in place of those provided by the bicycle manufacturer required.

To remove the accessory, the bolts 21 and the rear axle nuts are removed. Thus this accessory is both readily placed on and removed from any existing bicycle.

It is to be understood that lightweight, nonresilient, strap steel could be substituted for the rods and foot board, welding could be used instead of bolts-nuts 46–34, and a roller bearing for the wheel 24.

Although but one specific embodiment of this invention is shown and described in the drawings, it is to be understood that numerous details may be altered and omitted without departing from the spirit of this invention as defined by the following claims.

We claim:

1. An accessory for a single-seater bicycle comprising a pair of foot boards each secured at one end to the respective pedal of a bicycle and extending rearwardly, a framework removably secured to the rear axle of said bicycle to support the free end of said foot board and stabilize the same, and rotatable means on said framework, said framework being substantially U-shaped and extending substantially above the axis of the rear axle of said bicycle and comprising a vertical upwardly-extending short leg and a spaced longer vertical upwardly-extending leg, the longer leg being secured to the rear axle of said bicycle, and said short leg supporting a rotatable means adjacent the distal end thereof on which said foot board is slidable, a third horizontally-extending leg for retaining said other legs in spaced relationship, track means on the underside of said footboard providing a track for guiding said footboard on said rotatable means, and overhanging downwardly disposed L-shaped means on said framework to guide and retain said footboard on said rotatable means.

2. The device according to claim 1 wherein the foot board and the bicycle pedal are secured together by means of a U-shaped clamp and a bolt and nut.

* * * * *